(12) United States Patent
Hovens et al.

(10) Patent No.: US 6,375,409 B1
(45) Date of Patent: Apr. 23, 2002

(54) COMBINED LORRY AND TRANSPORT UNIT SYSTEM AND METHOD

(75) Inventors: Petrus Johannes Petronella Hovens, St Tegelen (NL); Theodorus Arnoldus Johannes Lücker, Oude Schans 7, NL-5953, BA, Ba Reuver (NL)

(73) Assignee: Theodorus Arnoldus Johannes Lücker (NL)

( * ) Notice: Subject to any disclaimer, the term of this patent is extended or adjusted under 35 U.S.C. 154(b) by 0 days.

(21) Appl. No.: 09/423,845

(22) PCT Filed: May 12, 1998

(86) PCT No.: PCT/NL98/00265

§ 371 Date: Feb. 11, 2000

§ 102(e) Date: Feb. 11, 2000

(87) PCT Pub. No.: WO98/51531

PCT Pub. Date: Nov. 19, 1998

(30) Foreign Application Priority Data

May 15, 1997 (NL) .............................................. 1006062

(51) Int. Cl.⁷ .................................................. B60P 1/44
(52) U.S. Cl. ........................ 414/812; 414/462; 414/498
(58) Field of Search ................................. 414/462, 480, 414/498, 537, 812; 293/118, 119; 280/43.24

(56) References Cited

U.S. PATENT DOCUMENTS

| | | | | |
|---|---|---|---|---|
| 3,588,160 A | * | 6/1971 | Reiner ........................ 293/118 |
| 3,695,471 A | * | 10/1972 | Rivers, Jr. ................... 414/498 |
| 4,239,447 A | * | 12/1980 | Bach .......................... 414/813 |
| 4,621,969 A | * | 11/1986 | Berghall et al. ........ 414/331.07 |
| 4,669,944 A | * | 6/1987 | Tarbell ....................... 414/537 |
| 4,951,991 A | * | 8/1990 | Haigler ........................ 296/26 |
| 5,628,522 A | * | 5/1997 | Hall ........................ 280/43.24 |
| 5,785,485 A | * | 7/1998 | Hall ............................. 414/498 |
| 6,059,330 A | * | 5/2000 | Moffett et al. ............... 293/118 |

* cited by examiner

Primary Examiner—James W. Keenan

(57) ABSTRACT

The invention relates to method and to a combination of a lorry (1) and a transport unit (6) for transporting and distributing goods by means of a lorry comprising a load compartment (2). A transport unit (6) comprising ground wheels is used, which transport unit (6) is hitched to the lorry on the rear side of the load compartment during road travel of the lorry, whereby a lifting device is used. A transport unit (6) comprising an auxiliary load compartment (7) bounded by a floor and by upright walls is used, which auxiliary load compartment (7) has cross-sectional dimensions which at least substantially correspond with the cross-sectional dimensions of the load compartment (2) of the lorry (1). The goods are transferred from the load compartment (2) of the lorry (1) to the auxiliary load compartment (7) of the transport unit (6) when they are to be distributed, and the goods thus transferred are transported further by means of said transport unit (6).

10 Claims, 2 Drawing Sheets

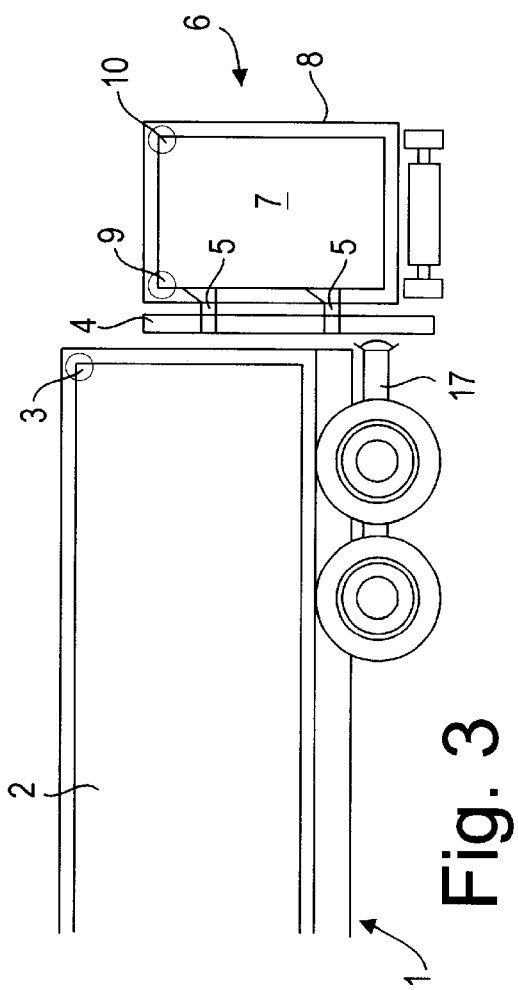
Fig. 3
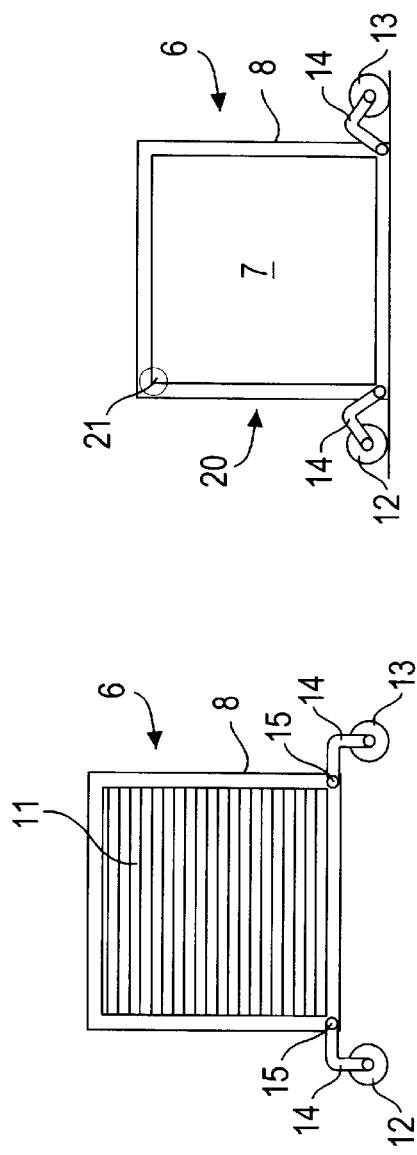
Fig. 6
Fig. 4
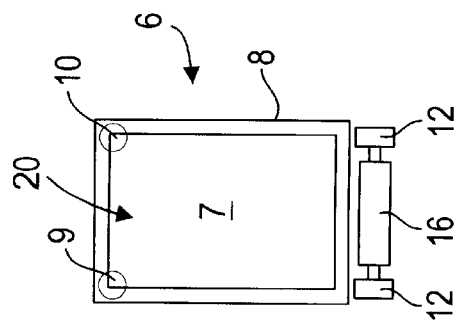
Fig. 5

COMBINED LORRY AND TRANSPORT UNIT SYSTEM AND METHOD

The invention relates to a method for transporting and distributing goods by means of a lorry comprising a load compartment, wherein a transport unit comprising ground wheels is used, which transport unit is hitched to the lorry on the rear side of the load compartment during road travel of the lorry, whereby a lifting device is used, by means of which the transport unit can be moved in vertical direction with respect to the lorry.

A method of this kind can be derived from British patent No. 647,075. With this known device the transport unit is made up of a partition, which occupies a vertical position on the rear side of the load compartment during road travel of the lorry, so as to bound the load compartment. Said partition can be moved to a horizontal position for the purpose of unloading the lorry, and be provided with ground wheels. In that case the partition can be moved up and down by means of a lifting device which is connected to the lorry, and, once it has been placed on the ground, it can be moved independently of the lorry.

According to the invention a transport unit comprising an auxiliary load compartment bounded by a floor and by upright walls is used, which auxiliary load compartment has cross-sectional dimensions which at least substantially correspond with the cross-sectional dimensions of the lorry, whereby the goods are transferred from the load compartment of the lorry to the auxiliary load compartment of the transport unit when they are to be distributed, and the goods thus transferred are transported further by means of said transport unit.

When using this method, the floor of the transport unit will form an extension of the floor of the load compartment of the lorry when the transport unit is coupled to the lorry, and it will be possible to utilize said floor for supporting the goods to be transported during road travel of the lorry.

In other words, the transport unit may be regarded as a detachable part of the total load compartment of the lorry, which detachable part can be used for transporting goods between the place where the driver has been able to park the lorry in a suitable manner, and the place where goods must be delivered and/or from where goods must be collected. In view of its comparatively small dimensions, the transport unit can furthermore be driven through the shopping public without any objection thereby, for example in order to deliver goods to a specified shop in a shopping street or a shopping centre.

Another aspect of the invention relates to a combination of a lorry comprising a load compartment and a transport unit provided with ground wheels, which can be coupled to the lorry behind the load compartment, wherein the combination comprises lifting means for moving the transport unit in vertical direction from the ground to the position behind the load compartment of the lorry, and vice versa. According to the invention, the transport unit thereby comprises an auxiliary load compartment for accommodating goods, which auxiliary load compartment is bounded by a floor and by upright walls, wherein the auxiliary load compartment has cross-sectional dimensions which at least substantially correspond with the cross-sectional dimensions of the load compartment of the lorry.

When this construction is used, the transport unit may also be used for accommodating cargo during road travel of the lorry, whereby the auxiliary load compartment forms a detachable extension of the lorry, as it were, whereby the overall length of the lorry and the transport unit coupled to the rear side thereof can be selected to be the maximum allowable length dimension for such a combination, so as to obtain a maximum loading volume. In spite of the large dimension of such a combination, it will still be readily possible to deliver goods at places which are difficult to reach by using the detachable rear part of the combination in the form of the transport unit.

It is noted that European patent application No. 0 239 345 discloses a lorry, wherein the rear part of the loading platform can be moved up and down by lifting means. Said part of the loading platform, however, does not form a transport unit which comprises a load compartment bounded by the floor and by upright walls, and which can be disconnected from the lorry for transport of the goods independently of the other part of the lorry.

It is noted that the term "lorry" used herein is understood to mean not only a self-propelled lorry, however also a wagon which is drawn, for example a semitrailer or a trailer.

The invention will be explained in more detail hereafter with reference to a diagrammatic embodiment of a combination of a lorry and a transport unit in a raised position.

FIG. 3 is a side view corresponding with FIG. 2, wherein the transport unit has been moved down.

FIG. 4 is a view of the transport unit, wherein the transport unit occupies a position which is suitable for road transport.

FIG. 5 is a side view of FIG. 4.

FIG. 6 is a view corresponding with FIG. 4, wherein the wheels have been pivoted, however, so that the transport unit rests on the ground.

Figure 1:
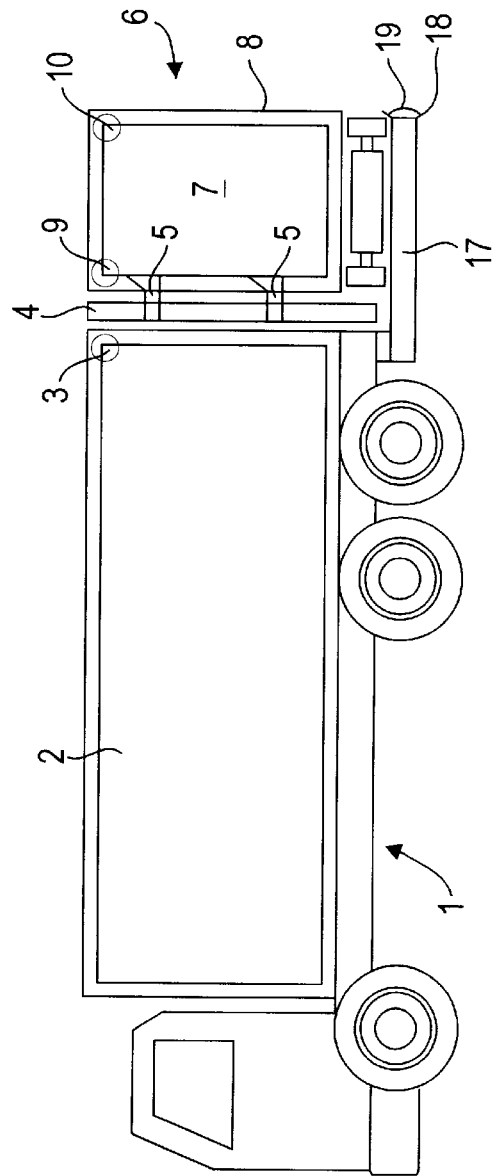
FIG. 1 is a diagrammatic side view of a combination of a lorry and a transport unit, wherein said transport unit is shown to occupy a raised position.

FIG. 1 shows a usual lorry 1, which is provided with a superstructure 2, which bounds a load compartment. Access to the load compartment can be gained at the rear side via an opening, which can for example be closed by means of a rolling shutter, which can for example be wound on a drum 3 which is provided near the upper side of the opening.

Furthermore, a lifting device 4 (diagrammatically indicated) is provided on the rear side of the load compartment. Said lifting device 4 is provided with coupling elements 5, by means of which a transport unit 6 can be moved in vertical direction between the position shown in FIGS. 1 and 3, in which the contours of transport unit 6 coincide with those of load compartment 2, seen in the longitudinal direction of the vehicle, and a position in which the transport unit rests on the ground (FIG. 3).

In the illustrated embodiment, the transport unit comprises a frame 8, which bounds an auxiliary load compartment 7. The width and the height of auxiliary load compartment 7 preferably corresponds, at least substantially so, with the width and the height of superstructure of load compartment 2, whilst the length of auxiliary load compartment 7, seen in FIGS. 1 and 2, in a direction which corresponds with the longitudinal direction of lorry 1, is considerably smaller than the length of load compartment 2.

Figure 2:
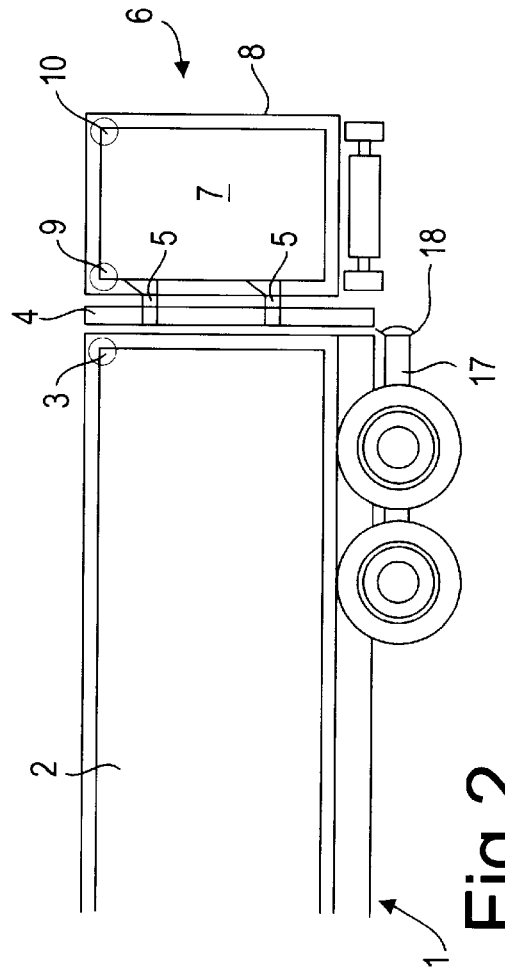
FIG. 2 shows a part of the lorry comprising the transport unit as shown in FIG. 1, with the bumper in retracted position.

The boundary surface of auxiliary load compartment 7, which faces towards load compartment 2 in the coupled position of the transport unit as shown in FIGS. 1 and 2, forms a closable opening, for example an opening which can be closed by means of a rolling shutter, which can be wound on a drum 9. The opposite side of auxiliary load compartment 7 may likewise be provided with an opening, which can be closed by means of a rolling shutter 11, which can be wound on a drum 10. Furthermore, one of the other sides, or both sides, may be provided with openings 20, if desired, which openings may or may not be closable by mechanism 21.

The transport unit is furthermore provided on opposite ends with ground wheels 12 and 13, which are coupled to the underside of the frame 8 by means of levers 14, in such a manner that said levers 14 can be adjusted about horizontally extending pins 15 by adjusting means (not shown). Another possibility is to mount wheels 12 and 13 in such a manner that they are capable of movement in horizontal and in vertical direction. A drive unit 16 is mounted between wheels 12. Said drive unit 16 may for example be an electric motor, which is fed from batteries (not shown), which are mounted on transport unit 6. If transport unit 6 is coupled to the lorry in the manner which is shown in FIG. 1, said batteries can be fed from the electric system of the lorry.

The wheels 12 and/or 13 may be steerable, for example by means of a steering element (not shown), which is coupled to wheels 13.

The lorry is furthermore provided with a supporting element 17, which is movable in horizontal direction with respect to the chassis of the lorry, and to one end of which a bumper 18 comprising rear lights 19 and the like is secured.

When the transport unit 6 has been moved to the raised position as shown in FIG. 1 for transport by road by means of lorry 1, wheels 12 and 13 will have been pivoted to a position in which they are positioned under transport unit 6. Supporting element 17 has furthermore been moved to the extended position shown in FIG. 1 thereby, and said supporting element may be utilized for supporting the transport unit. At the beginning of said transport, not only the load compartment 2 of the lorry 1, but also the auxiliary load compartment 7 of transport unit 6 may be filled with goods to be distributed. When goods are to be transferred to a destination which is difficult to reach by lorry 1, said lorry 1 can be parked somewhere in the vicinity of said destination. Then supporting element 17 can be moved under the chassis of the lorry, as is diagrammatically shown in FIG. 2, after which transport unit 2 can be moved downwards, possibly after the auxiliary load compartment has been loaded from the load compartment of the lorry, after the wheels 12 and 13 have been pivoted outwards. The transport unit 6 can then be driven to the desired location in order to be unloaded. When the transport unit is to be unloaded, the wheels can be pivoted to the position shown in FIG. 6, so that the transport unit will come to rest on the ground, which may in some cases facilitate the unloading of the transport unit.

It will be apparent, that the contents of the lorry can thus be gradually unloaded at one or more locations with the aid of transport unit 6. It is also possible, of course, to use transport unit 6 for loading the lorry, for example with return goods of the companies to which goods are being supplied by means of the lorry and the transport unit.

The transport unit 6 may also be used as a conventional tailboard, since it is also possible to remove goods which are present in auxiliary load compartment 7 from said auxiliary load compartment in the position of the transport unit 6 that is shown in FIG. 3, without uncoupling the transport unit from the lorry. Wheels 12 and 13 will have been pivoted to the outward position thereby, so that the loading platform of the transport unit can be lowered to ground level.

It is also conceivable for the transport unit to be driven by hydraulic or mechanical means instead of by electric means, in which case the transport unit may for example be fitted with its own combustion engine. Furthermore it is conceivable to move the transport unit forward by hand.

The construction of the transport unit may be different from the embodiments described and depicted herein. The construction of the transport unit will be partially determined by the goods to be transported, whereby it will for example be conceivable for the transport unit to be made up of a loading platform without a superstructure, which is provided with ground wheels.

Another possibility is to fit the transport unit, rather than the lorry, with a lifting device.

What is claimed is:

1. A method of transporting goods to a destination, the method comprising:
   removably coupling a transport unit adjacent a rear side of a superstructure of a lorry in a position in which a floor of the transport unit forms an extension of a floor of the load compartment of the lorry, wherein the superstructure defines a first load compartment with first longitudinal cross section dimensions, and the transport unit includes a frame defining a second load compartment with second longitudinal cross section dimensions substantially corresponding to the first longitudinal cross section dimensions;
   driving the lorry to a position prior to the destination;
   placing the goods in the second load compartment,
   lowering the transport unit to the ground; and
   using the transport unit to move the goods a remaining distance between the position prior to the destination and the destination.

2. The method of claim 1 wherein using the transport unit to move the goods comprises using a drive unit to turn at least one wheel coupled to the frame.

3. The method of claim 1 wherein placing the goods in the second load compartment occurs before driving the lorry to a position prior to the destination.

4. The method of claim 1 wherein the transport unit comprises a wheel and a drive unit mechanically coupled to the wheel, and wherein using the transport unit to move the goods the remaining distance comprises driving the wheel using the drive unit.

5. A transport system comprising:
   a lorry including a superstructure, wherein the superstructure defines a first load compartment having a first longitudinal cross section;

a transport unit including a frame and wheels coupled to and positioned underneath the frame, wherein the frame defines a second load compartment having a second longitudinal cross section substantially corresponding to the first longitudinal cross section;

a drive unit coupled to at least one of the wheels; and a lifting device, wherein the lifting device removably couples the lorry and the transport unit, and moves the transport unit between a first position in which the first and second longitudinal cross sections are substantially coincident and a floor of the transport unit forms an extension of a floor of the load compartment of the lorry, and a second position in which the wheels rest on the ground.

6. The system of claim 5 wherein the transport unit further includes:

a lorry-facing side defining an opening adjacent the first load compartment when the transport unit is in the first position; and a mechanism for closing the opening.

7. The system of claim 6 wherein the transport unit further includes:

a second side positioned opposite the lorry-facing side and defining a second opening; and a second mechanism for closing the second opening.

8. The system of claim 7 wherein the transport unit further includes:

a third side defining a third opening; and a third mechanism for closing the third opening.

9. The system of claim 5 wherein the wheels are pivotally coupled to the frame so as to allow each wheel to be displaced vertically and horizontally with respect to the frame.

10. The system of claim 5 wherein the lorry further comprises:

a supporting unit configured to move between an extended position that supports the transport unit in the first position, and a retracted position that allows the transport unit to move to the second position.

* * * * *